United States Patent
Dahl

(10) Patent No.: US 7,343,556 B2
(45) Date of Patent: Mar. 11, 2008

(54) TECHNIQUE FOR PROCESSING AND GENERATING MESSAGES IN MULTIPLE LANGUAGES

(75) Inventor: Andreas D. Dahl, Rauenberg (DE)

(73) Assignee: SAP AG, Walldorf (DE)

( * ) Notice: Subject to any disclaimer, the term of this patent is extended or adjusted under 35 U.S.C. 154(b) by 294 days.

(21) Appl. No.: 11/026,629

(22) Filed: Dec. 30, 2004

(65) Prior Publication Data
US 2006/0150097 A1 Jul. 6, 2006

(51) Int. Cl.
G06F 15/00 (2006.01)
G06F 17/00 (2006.01)

(52) U.S. Cl. .................. 715/536; 715/530; 715/531; 715/522; 715/523

(58) Field of Classification Search ............... 715/536, 715/530, 531, 522, 523
See application file for complete search history.

(56) References Cited

U.S. PATENT DOCUMENTS

| | | | | |
|---|---|---|---|---|
| 4,884,199 | A * | 11/1989 | Boothroyd et al. | 715/709 |
| 5,148,541 | A * | 9/1992 | Lee et al. | 707/2 |
| 5,835,912 | A * | 11/1998 | Pet | 707/104.1 |
| 6,400,287 | B1 * | 6/2002 | Ehrman | 341/55 |
| 6,757,688 | B1 * | 6/2004 | Leapaldt et al. | 707/101 |
| 6,983,468 | B1 * | 1/2006 | Green et al. | 719/331 |
| 7,051,278 | B1 * | 5/2006 | Ehrman | 715/536 |
| 7,149,964 | B1 * | 12/2006 | Cottrille et al. | 715/513 |
| 2002/0052902 | A1 * | 5/2002 | Bauer | 707/536 |
| 2002/0177993 | A1 * | 11/2002 | Veditz et al. | 704/8 |
| 2003/0004786 | A1 * | 1/2003 | Tokieda et al. | 705/10 |
| 2003/0125972 | A1 * | 7/2003 | Luce et al. | 705/1 |
| 2004/0205675 | A1 * | 10/2004 | Veerappan et al. | 715/536 |

OTHER PUBLICATIONS

Missbach, Michael et al.; SAP Hardware Solutions: Servers, Storage, and Networks fo mySAP.com; Publisher: Prentice Hall; Pub Date: Nov. 20, 2000; pp. 1-7.*

* cited by examiner

Primary Examiner—Doug Hutton
Assistant Examiner—N Hillery
(74) Attorney, Agent, or Firm—Mintz, Levin, Cohn, Ferris, Glovsky & Popeo, P.C.

(57) ABSTRACT

A method for processing a received message is provided. Such a method may associate the message with a default language that corresponds to a default codepage. Thereafter, portions of the message are identified as having language keys corresponding to unique language key codepages associated therewith. The language of each of the identified portions of the message is converted using the corresponding language key codepage and the language of portions of the message that do not have an associated language key with is converted with a default codepage. Also disclosed is a method for generating a message that associates the message with a default language and assigns each portion of the message that is not in the default language with a language key that corresponds to the language.

21 Claims, 5 Drawing Sheets

TECHNIQUE FOR PROCESSING AND GENERATING MESSAGES IN MULTIPLE LANGUAGES

TECHNICAL FIELD

This invention relates to the data processing.

BACKGROUND

Messages and documents are increasingly being generated in multiple languages. These type of messages are frequently processed via message handling systems that are connected to an enterprise application or other systems operating in a client/server architecture (in which the client performs the application processing functions and the server system performs the data management functions). In particular, message handling systems are often used as part of resource management systems, customer relationship management systems, human resource management systems, supply chain management systems, and financial management systems.

Messaging applications receive asynchronous messages from an originating enterprise application for delivery to a receiving enterprise application. Such messages are stored by the receiving enterprise application in a single database table and may contain portions that are in multiple languages (e.g., English, Russian, Chinese, etc.) (or a single database table may store single language messages that are in a wide variety of languages). This type of database table is known as a multi-display, multi-processing (MDMP) database table.

With conventional MDMP database tables, messages are stored without a language key (explicit or implicit) that can identify the language of the message. When an enterprise application server receives a message, a codepage is selected to convert the message into a default language that corresponds to the login language of the user (e.g., if the server is using a German language Linux operating system, then the message would be converted into German). However, if the received message is in more than one language, the language of the message will not be properly converted as conventional enterprise applications only use a single codepage to convert message languages. Therefore, only those portions of the message that pertain to the same base language as the codepage will be properly converted (i.e., if the codepage has a baseline for converting English messages, and a received message is in English and in Korean, those. portions in Korean will not be properly converted). Remedying these conversion errors requires redundant conversion programs which require extra processing time while consuming additional processing resources.

Moreover, on the messaging application side, as there are no language keys associated with a message, messages are converted (into a language such as Unicode) using a single codepage based on the premise that all of the received message is in the login language of the user. Only those portions of the received message that are in the login language are properly converted. Characters that are common between the login language and the messaging application codepage may be improperly translated and other characters that do no correspond will be assigned a substitution character. Such an arrangement will result in portions of the material description being unreadable by intended recipients (e.g., enterprise applications, users, etc.).

Accordingly, it will be appreciated there remains an improved technique for processing and/or generating messages that are either wholly or partially in multiple languages.

SUMMARY

A method for processing a received message is provided. Such a method may comprise the steps of associating the message with a default language, wherein the default language corresponds to a default codepage, identifying portions of the message having an associated language key, wherein each of the language keys corresponds to a unique language key codepage, and converting a language of each of the identified portions of the message with the corresponding language key codepage and converting a language of portions of the message not having an associated language key with the default codepage.

In some variations, each portion of the message has an associated language key so that no portion of the message is converted using a default codepage. In addition, in some variations, the method omits the step of associating the message with a default language and identifies associated language keys for each portion of the message.

The method may include the preliminary steps of assigning each portion of the message not in the default language with a language key corresponding to the language, and sending the message. The message may be sent/received via a computer network such as a LAN, WAN, the Internet, etc. The received message may be received directly or indirectly from a messaging application and/or an originating enterprise system. The received message may also be sent to and received by a plurality of enterprise systems (from, for example, a messaging system and/or an originating enterprise system). These enterprise systems may be, for example, resource management systems, customer relationship management systems, human resource management systems, supply chain management systems, financial management systems, and the like.

The method may also include the step of storing the received message in a multi-language, multi-table database. The identifying step, in some variations, may extract language keys from the message, using, for example, a language key extractor.

An interrelated method for processing a message in at least one of a plurality of languages is also described herein. This method may include the steps of associating the message with a default language, wherein the default language corresponds to a default codepage, and assigning each portion of the message not in the default language with a language key corresponding to the language, wherein each language key corresponds to a unique language key codepage. In some variations, this method may also include some or all of the steps of receiving the message, determining the default language of the message, identifying the portions of the message having an associated language key, and converting a language of each of the identified portions of the message with the corresponding language key codepage and converting a language of portions of the message not having an associated language key with the default codepage.

The methods disclosed herein may be conducted by a computer program product, embodied on computer readable-material, that includes executable instructions for causing a computer system to perform the various method steps. Optionally, or in addition to, the methods described herein may be implemented in a computer system comprising a processor, and a memory coupled to the processor encoding one or more programs that cause the processor to perform the various method steps:

An apparatus for processing a received message is also provided that includes an association unit to associate the message with a default language that corresponds to a default codepage. Also included in such an apparatus is an identification unit to identify portions of the message having an associated language key and each of the language keys corresponds to a unique language key codepage. A conversion unit converts a language of each of the identified portions of the message with the corresponding language key codepage and converts a language of portions of the message not having an associated language key with the default codepage.

An interrelated apparatus for processing messages in more than one language is also described. This apparatus includes an association unit to associate the message with a default language that corresponds to a default codepage, and an assignation unit to assign each portion of the message not in the default language with a language key corresponding to the language. With this arrangement, each language key corresponds to a unique language key codepage.

Yet another interrelated apparatus is provided to process a message. The apparatus may include a messaging system module to generate a message in an intermediate format and associate portions of the message in languages other than a default language with a language key corresponding to the language, the messaging system module individually converting a language of each portion of the message having an associated language key with a code page corresponding to the language key and sending the converted message to an enterprise application system.

A interrelated system for processing a message is also provided herein. Such a system may include an enterprise application system module for generating a message in an intermediate format and associating portions of the message in languages other than a default language with a language key corresponding to the language. In addition, it may also include a messaging system module coupled to the enterprise application to receive the message and the language keys from the enterprise application and to individually convert a language of each portion of the message having an associated language key with a code page corresponding to the language key.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
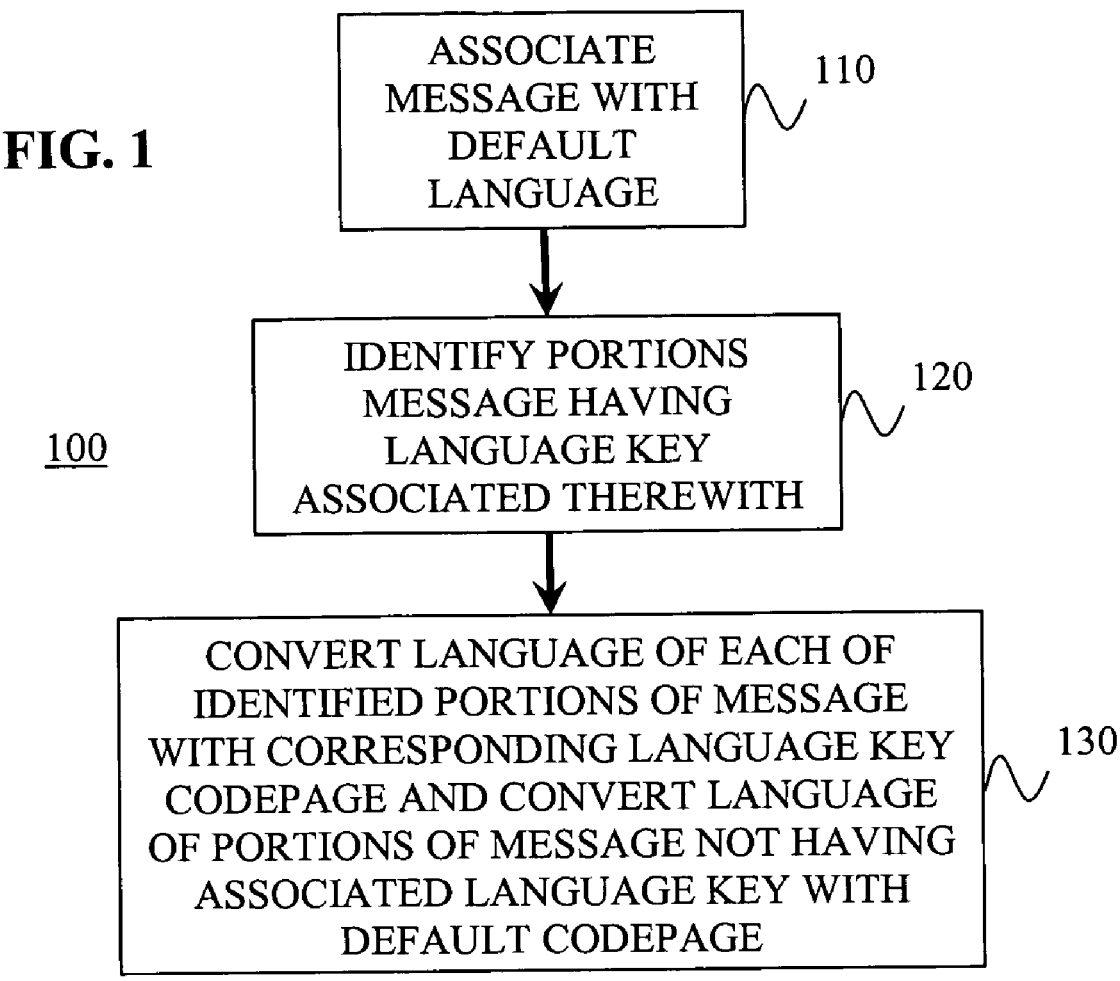
FIG. 1 is a process flow diagram for a method for processing a received message.

FIG. 1 illustrates a process flow diagram of a method 100 for processing a received message. The method 100, at step 110, associates the message with a default language such as the login language of the user. This default language has an associated default codepage associated that may later be used to convert the message. The method 100 also identifies, at step 120, portions of the message having an associated language key. These language keys each correspond to a unique language key codepage. Depending on the configuration of the message, there may be a single language, multiple sections each having different language keys, multiple sections that each have the same language key, and the like. At step 130, the method 100 converts a language of each of the identified portions of the message with the corresponding language key codepage and converts a language of portions of the message not having an associated language key with the default codepage. The conversion based on the language key codepage and the conversion that utilizes the default codepage may occur simultaneously or sequentially with either conversion occurring first. It will be appreciated that an associated language key may be an integral portion of the message or it may be an external identifier. It will also be appreciated that each portion of a message may have an associated language key so that each portion is converted using the corresponding codepage (as opposed to converting portions using a default codepage).

Figure 2:
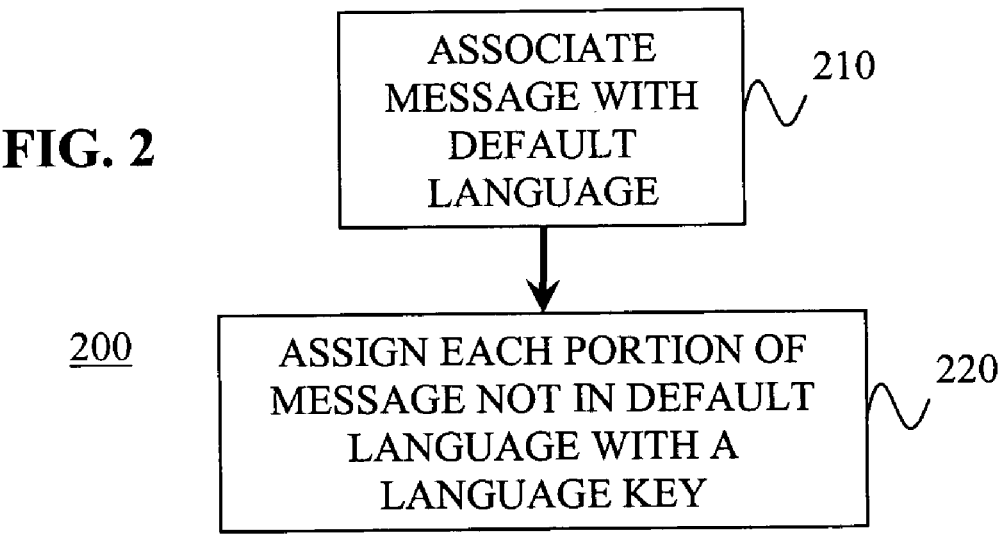
FIG. 2 is a process flow diagram for a method for processing a message in at least one of a plurality of languages.

FIG. 2 illustrates a process flow diagram for an interrelated method 200 that processes a message in one of a plurality of messages (with the message either being in one of the plurality of languages, or alternatively, containing portions that are in different languages). The method 200, at step 210, associates the message with a default language that has a corresponding default codepage. At step 220, each portion of the message not in the default language is assigned a language key corresponding to the language. Therefore, there may be a single language key, there may be multiple sections each having different language keys, there may be multiple sections that each have the same language key, and the like. Each language key may correspond to a unique language key codepage.

The method 200 of FIG. 2 may, optionally, also include the step of receiving the message by a recipient (e.g., an enterprise application or other network node). With this variation, the recipient determines the default language of the message and identifies the portions of the message having an associated language key. The language of each of the identified portions of the message is converted using the corresponding language key codepage and the language of the portions of the message not having an associated language key associated is converted using the default codepage.

Figure 3:
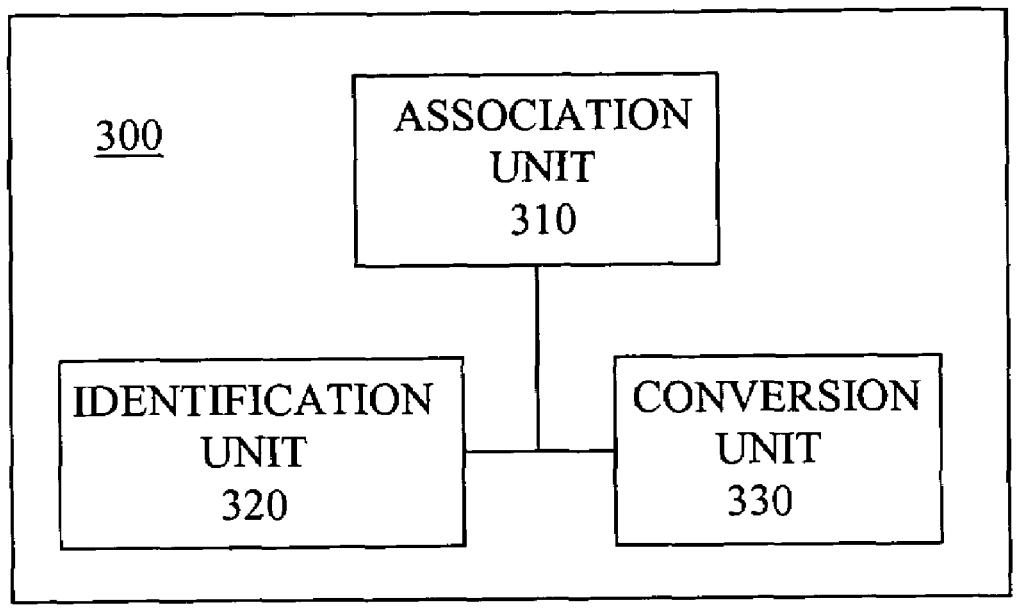
FIG. 3 is a schematic of an apparatus for processing a received message.

FIG. 3 illustrates an apparatus 300 for processing messages in more than one language. The apparatus 300 includes an association unit 310 that associates the message with a default language corresponding to a default codepage. Also included is an identification unit 320 that identifies portions of the message having an associated language key. The message may have language keys of one or multiple types with each language key corresponding to a unique language key codepage. The apparatus 300 also includes a conversion unit 330 that converts each of the identified portions of the message with the corresponding language key codepage. The conversion unit 330 also converts portions of the message not having an associated language key with the default codepage.

Figure 4:
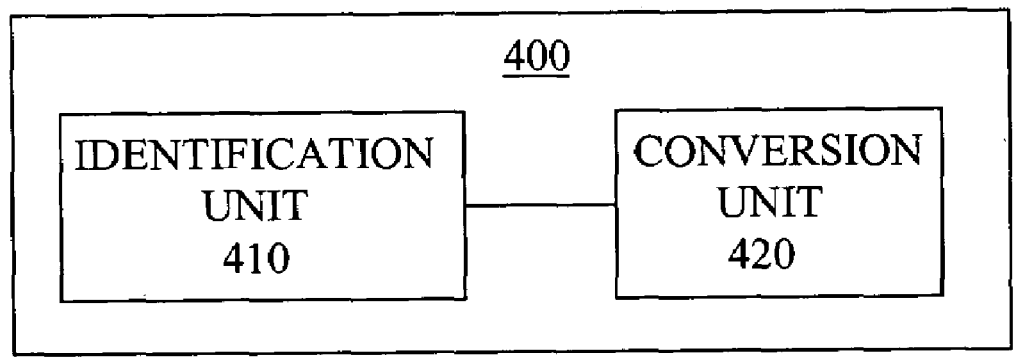
FIG. 4 is a schematic of an apparatus for processing a message in at least one of a plurality of languages.

FIG. 4 illustrates an interrelated apparatus 400 for processing messages in more than one language. The apparatus 400 includes an association unit 410 that associates the message with a default language that corresponds to a default codepage. Additionally, the apparatus 400 includes an assignation unit 410 that assigns each portion of the message not in the default language with a language key corresponding to the language. Each of such language keys correspond to a unique language key codepage.

The following provides optional variations that may be used in connection with the interrelated embodiments described above as well as examples that are useful for understanding and implementing the subject matter described herein.

Figure 5:
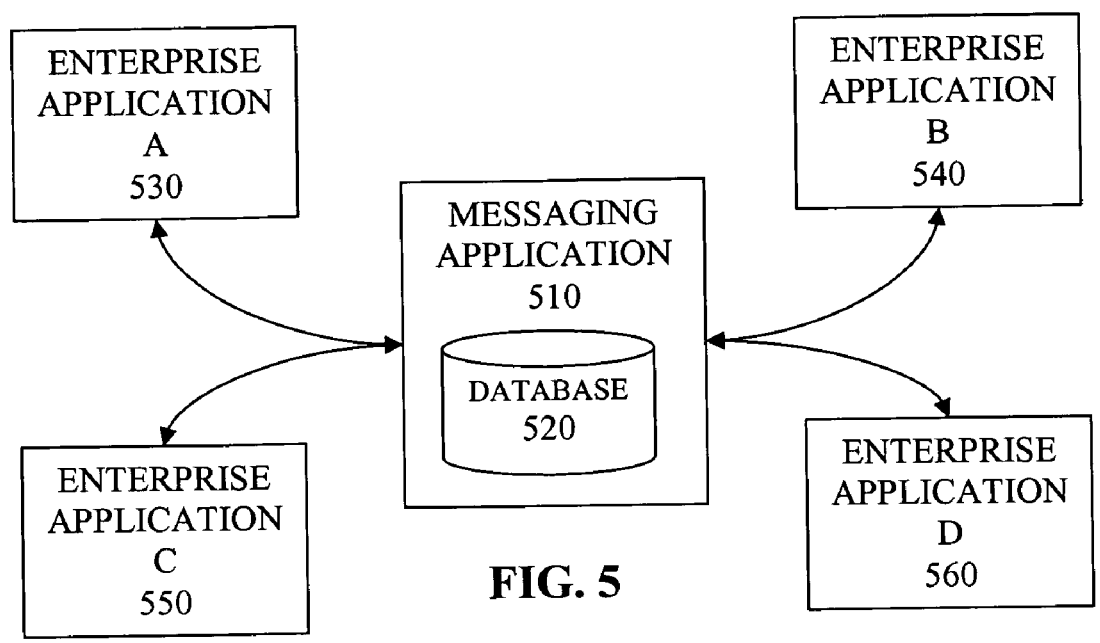
FIG. 5 is a schematic diagram illustrating the relationship between a messaging application and a plurality of enterprise applications.

FIG. 5 illustrates a schematic 500 in which a central messaging application 510 having a database 520, is coupled via a network to a plurality of enterprise applications 530, 540, 550, 560. With this arrangement, an originating enterprise application 530 may send a message via the messaging application 510 to any of the other enterprise applications 540, 550, 560. This message may be in one or more languages which are different than those mainly utilized by one of the other enterprise applications 540, 550, 560.

The message may be any of a sort of intermediate format data set that may be utilized by a plurality of heterogeneous enterprise applications (e.g., an SAP IDoc). The message may include administration information to facilitate technical processing, as well as actual application data stored in segments. The segment may include segment fields or data elements as the smallest unit.

In some variations, the message may include a header line, several connected data segments and status records. The header may define the content, structure, sender, receiver, and status of the message. The data segments may include a leader (a consecutive segment number and a description of the type of segment) and a field string 1000 characters long (containing segment data). The status records may describe historical processing steps of the message.

The enterprise applications 530, 540, 550, 560 may each include a fixed interface between an application and a message transfer layer (which communicates with a message transfer layer of the messaging application 510). The fixed interface may include a language extractor that identifies the parts of the message that are to be associated with a particular language key (each of which are in turn associated with a language key codepage). The enterprise applications 530, 540, 550, and 560 may also each contain a codepage converter for selectively converting portions of the messages based on the associated language keys.

Figure 6A:
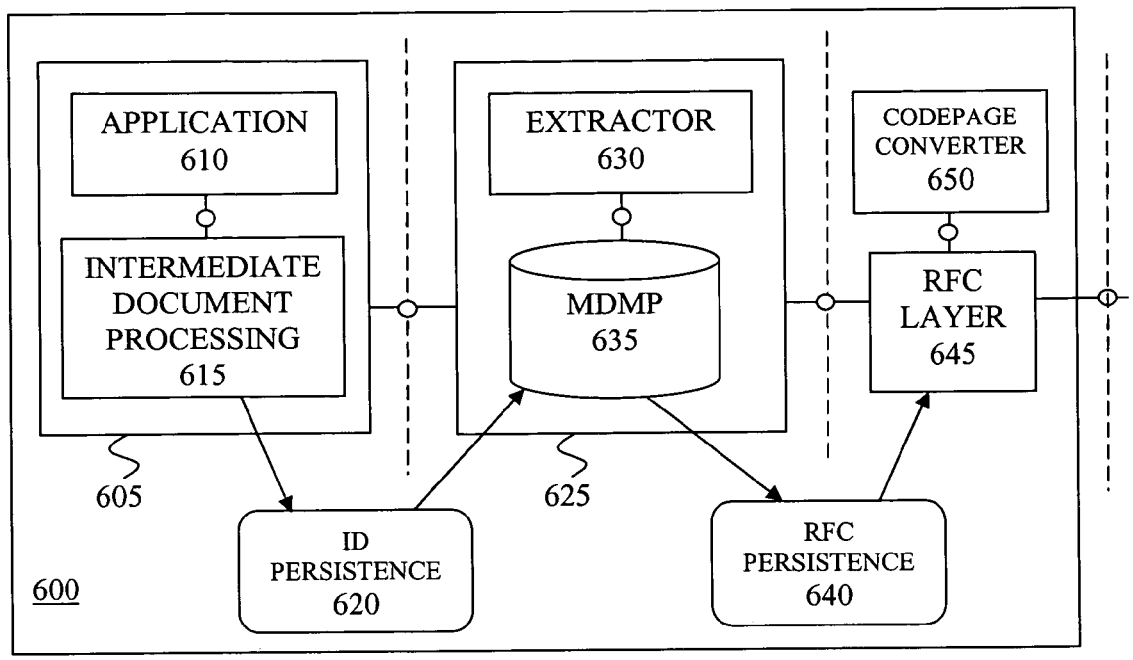
FIG. 6A is a schematic diagram of a messaging application for, processing an outbound message.
Figure 6B:
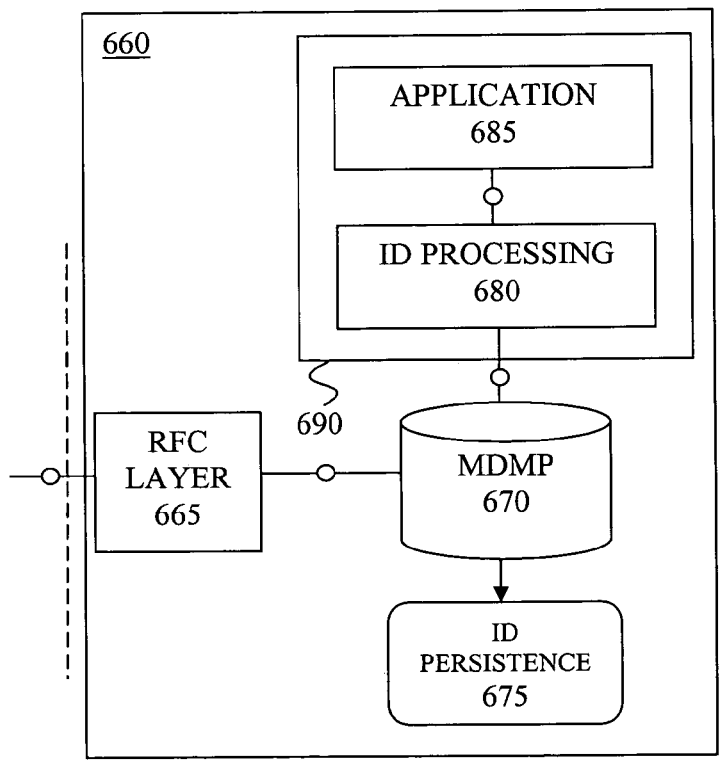
FIG. 6B is a schematic diagram of an enterprise application for processing a received message received from the messaging application of FIG. 6A.

FIGS. 6A and 6B illustrate a schematic of an example system for outbound processing of an intermediate format message useful for understanding and implementing the subject matter described herein. A messaging system 600 is coupled to an enterprise application system 660. An application 610 residing in an application layer 605 generates messages for transmittal to the enterprise application system 660 that are processed by an intermediate document processing unit 615. The application 610 utilizes a default language, which may, for example, be a login language used for the application generating and/or receiving a message. The intermediate document processing unit 615 generates an intermediate format message (or document) that may be permanently stored for later update, retrieval and/or deletion by an intermediate document persistence unit 620 (which may, for example, be a flat file, a relational database, an object-relational databases, a hierarchical database, a network databases, an objectbase, and the like).

The intermediate format message is sent to an MDMP database 635 for storage within a sending message layer 625. An extractor 630 coupled to the MDMP database 635 identifies portions of the message in different languages and associates these portions with corresponding language keys. The intermediate format message with the language keys is stored in the MDMP database 635 for transfer to a Remote Function Call (RFC) layer 645 via an RFC persistence unit 640. A codepage converter 650 within the RFC layer 645 converts the languages of message parts from the source codepage (which in this instance is Unicode) using codepages associated with each corresponding language key to form a converted intermediate format message.

The converted intermediate format message is transported to the enterprise application system 660. An MDMP database receives the converted intermediate format message via an RFC layer 665. The converted intermediate format message is stored in an intermediate document persistence unit 675 and is also sent to an application layer 690 for ultimate processing by an application 685. An intermediate document processing unit 680 may convert or otherwise modify the format of the intermediate document so that it is compatible with the application 685.

Figure 7A:
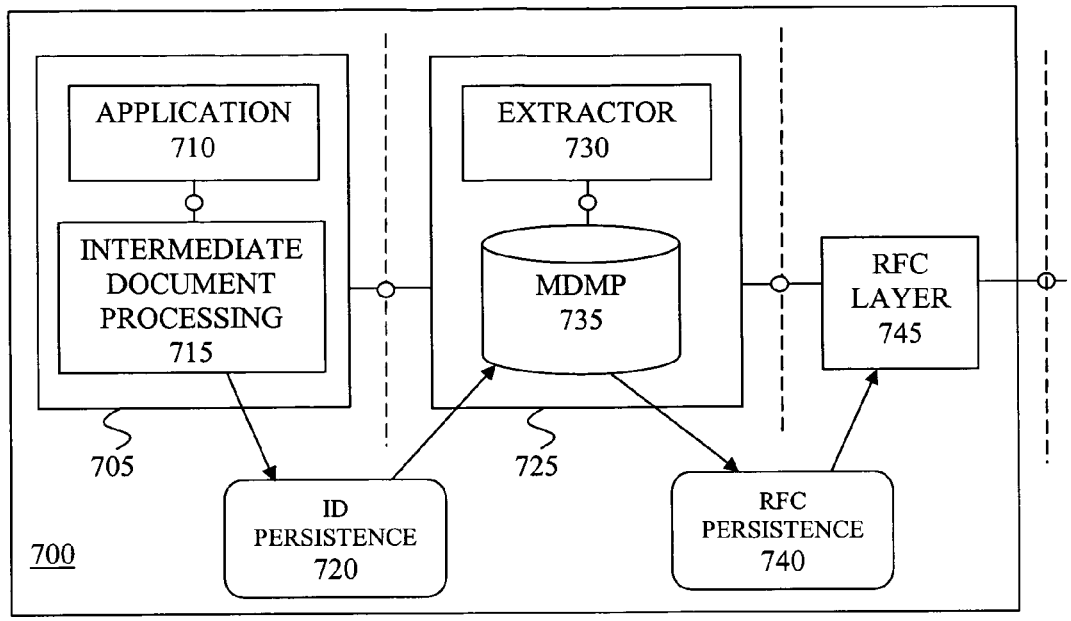
FIG. 7A is a schematic diagram of an enterprise application for processing an outbound message.
Figure 7B:
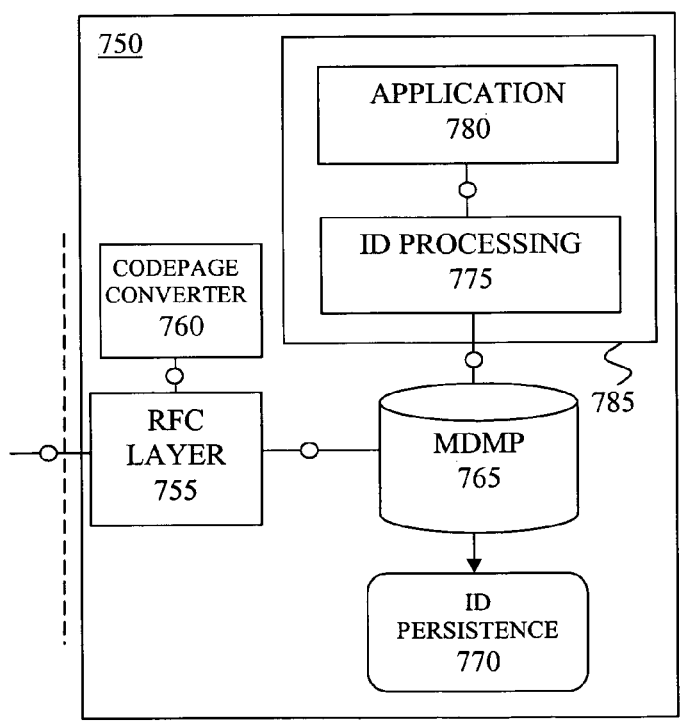
FIG. 7B is a schematic diagram of a messaging application for processing an inbound message received from the enterprise application of FIG. 7A.

FIGS. 7A and 7B illustrate a schematic of an example system for inbound processing of an intermediate format message useful for understanding and implementing the subject matter described herein. With this variation, an enterprise application system 700 is coupled to a messaging system 750. The enterprise application includes an application 710 and an intermediate document processing unit 715 in an application layer 705. An intermediate format message is generated by the application layer 705 and is stored in an intermediate document persistence unit 720. The intermediate format message is stored in an MDMP database 735 in a sending message layer 725. An extractor coupled to the MDMP associates language keys with portions of the messages based on the underlying language. The intermediate format message and the language keys (which may be separate or integrated) are sent to an RFC layer 745 via an RFC persistence unit 740 for transport to the messaging system 750.

The intermediate format message and the language keys are received by the messaging system 750 via an RFC layer 755. A codepage converter 760 converts the language of message parts from the source codepage using codepages associated with each corresponding language key to form a converted intermediate format message. The converted intermediate format message is stored in an MDMP database 765 and also in an intermediate document persistence unit 770. An application layer 790 obtains the converted intermediate format message from the MDMP database 765 for any applicable preprocessing by an intermediate document processing unit 775 for ultimate use by an application 780.

The subject matter described herein may be implemented in digital electronic circuitry, or in computer hardware, firmware, software, or in combinations of them. Apparatus of the subject matter described herein may be implemented in a computer program product tangibly embodied in an information carrier, e.g., in a machine-readable storage device or in a propagated signal, for execution by a programmable processor; and method steps of the subject matter described herein may be performed by a programmable processor executing a program of instructions to perform functions of the subject matter described herein by operating on input data and generating output. The subject matter described herein may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

A number of embodiments of the invention have been described. Nevertheless, it will be understood that various modifications may be made without departing from the scope of the invention. Accordingly, other embodiments are within the scope of the following claims.

What is claimed is:

1. A method for processing a received message, the method comprising:
   associating the message with a default language, the default language corresponding to a default codepage, the message containing characters that cannot be translated with the default codepage;
   identifying portions of the message including characters that cannot be translated with the default codepage and having an associated language key, each of the language keys corresponding to a unique language key codepage, the unique language key codepage being different than the default codepage;
   translating a language of each of the identified portions of the message using the corresponding language key codepage and translating a language of portions of the message not having an associated language key using the default codepage; and
   initiating storage of the received message.

2. The method of claim 1, wherein each portion of the message has an associated language key.

3. The method of claim 1, further comprising:
   assigning each portion of the message not in the default language with a language key corresponding to the language; and
   sending the message.

4. The method of claim 1, further comprising storing the received message in a multi-language, multi-table database.

5. The method of claim 1, wherein the identifying extracts language keys from the message.

6. The method of claim 1, wherein the message is received via a computer network.

7. The method of claim 1, wherein the message is received from a messaging system.

8. The method of claim 1, wherein the message is sent to a plurality of enterprise systems.

9. The method of claim 8, wherein the enterprise systems are chosen from the group comprising: resource management systems, customer relationship management systems, human resource management systems, supply chain management systems, and financial management systems.

10. A method for processing a message in at least one of a plurality of languages, the method comprising:
    associating the message with a default language, the default language corresponding to a default codepage, the message containing characters that cannot be translated with the default codepage;
    assigning each portion of the message having characters not in the default language with a language key corresponding to the language for such portion, each language key corresponding to a unique language key codepage, each unique language key codepage being different than the default codepage; and
    initiating transmission, of the message.

11. The method of claim 10, further comprising:
    receiving the message;
    determining the default language of the message;
    identifying the portions of the message having an associated language key; and
    translating each of the identified portions of the message using the corresponding language key codepage and translating portions of the message not having an associated language key using the default codepage.

12. The method of claim 10, wherein each portion of the message has an associated language key.

13. The method of claim 10, further comprising storing the received message in a multi-language, multi-table database.

14. The method of claim 10, further comprising transmitting the message is transmitted via a computer network.

15. A computer program product, tangibly stored and embodied on computer readable-media, the computer program product including modules for processing a received message, the modules comprising:
    an association unit to associate the message with a default language, the default language corresponding to a default codepage, the message containing characters that cannot be translated with the default codepage;
    an identification unit to identify portions of the message including characters that cannot be translated with the default codepage and having an associated language key, each of the language keys corresponding to a unique language key codepage;
a conversion unit to translate each of the identified portions of the message using the corresponding language key codepage and to translate portions of the message not having an associated language key using the default codepage, the unique language key codepage being different than the default codepage; and
a storage unit to initiate storage of the message.

16. The computer program product of claim 15, wherein the identification unit comprises a language key extractor to extract language keys from the message.

17. A computer program product, tangibly stored and embodied on computer readable-media, the computer program product including modules for processing messages in more than one language, the modules comprising:
an association unit to associate the message with a default language, the default language corresponding to a default codepage, the message containing characters that cannot be translated with the default codepage;
an assignation unit to assign each portion of the message containing characters not in the default language with a language key corresponding to the language, each language key corresponding to a unique language key codepage, each unique language key codepage being different than the default codepage; and
a transmission unit to initiate transmission of the message.

18. A computer program product, tangibly stored and embodied on computer readable-media, the computer program product including modules comprising:
an enterprise application system module to generate a message in an intermediate format with characters in a default language and to associate portions of the message having characters in languages other than a default language with a language key corresponding to the language; and
a messaging system module coupled to the enterprise application to receive the message and the language keys from the enterprise application and to individually translate each portion of the message having an associated language key using a code page corresponding to the language key and to initiate storage of the message, and to translate each portion of the message including characters in the default language with a default codepage, each unique language key codepage being different than the default codepage.

19. A computer program product for processing a received message, tangibly stored and embodied on computer readable-material, that includes executable instructions for causing a computer system to:
associate the message with a default language, the default language corresponding to a default codepage, the message containing characters that cannot be translated with the default codepage;
identify portions of the message having an associated language key, each of the language keys corresponding to a unique language key codepage, each unique language key codepage being different than the default codepage;
translate a language of each of the identified portions of the message using the corresponding language key codepage and translate a language of portions of the message not having an associated language key using the default codepage; and
initiating storage of the message.

20. A computer program product for processing a message in at least one of a plurality of languages, tangibly stored and embodied on computer readable-material, that includes executable instructions for causing a computer system to:
associate the message with a default language, the default language corresponding to a default codepage, the message containing characters that cannot be translated with the default codepage;
assign each portion of the message containing characters not in the default language with a language key corresponding to the language, each language key corresponding to a unique language key codepage, each unique language key codepage being different than the default eodepage; and
initiating transmission of the message.

21. A method comprising:
receiving a message in multiple languages having an associated default codepage;
identifying portions of the message corresponding to at least one codepage different than the default codepage;
translating the identified portions of the message using the corresponding at least one codepage translating the remaining portions of the message using the default codepage; and
initiating storage of the translated message.

* * * * *